United States Patent
Yoneda et al.

(10) Patent No.: US 7,874,714 B2
(45) Date of Patent: Jan. 25, 2011

(54) OPTICAL UNIT AND LIGHT IRRADIATING DEVICE

(75) Inventors: Kenji Yoneda, Kyoto (JP); Mitsuru Saito, Kyoto (JP); Takuzo Togawa, Kyoto (JP)

(73) Assignee: CCS, Inc., Kyoto (JP)

( * ) Notice: Subject to any disclaimer, the term of this patent is extended or adjusted under 35 U.S.C. 154(b) by 354 days.

(21) Appl. No.: 11/996,939

(22) PCT Filed: Jul. 27, 2006

(86) PCT No.: PCT/JP2006/314906

§ 371 (c)(1),
(2), (4) Date: Jan. 25, 2008

(87) PCT Pub. No.: WO2007/013563

PCT Pub. Date: Feb. 1, 2007

(65) Prior Publication Data
US 2010/0142207 A1    Jun. 10, 2010

(30) Foreign Application Priority Data
Jul. 29, 2005    (JP)    ............................. P2005-221659

(51) Int. Cl.
F21V 7/06    (2006.01)
F21V 8/00    (2006.01)

(52) U.S. Cl. ........................ 362/555; 362/300; 362/307; 362/327

(58) Field of Classification Search ................. 362/555, 362/326, 307, 296.01, 327, 296.08, 296.1, 362/300, 551; 359/726
See application file for complete search history.

(56) References Cited

U.S. PATENT DOCUMENTS

| 6,181,369 | B1 | 1/2001 | Ooshima et al. |
| 6,406,293 | B1 * | 6/2002 | Burstein ...................... 433/29 |
| 6,819,505 | B1 * | 11/2004 | Cassarly et al. ............. 359/726 |
| 6,819,506 | B1 * | 11/2004 | Taylor et al. ................. 359/726 |
| 6,857,873 | B2 * | 2/2005 | Bianchetti et al. ............. 433/29 |
| 7,168,839 | B2 * | 1/2007 | Chinniah et al. ............. 362/555 |
| 7,275,849 | B2 * | 10/2007 | Chinniah et al. ............. 362/555 |
| 7,410,283 | B2 * | 8/2008 | West et al. ................... 362/573 |
| 2004/0012965 | A1 * | 1/2004 | Yoneda et al. ............... 362/294 |

FOREIGN PATENT DOCUMENTS

| EP | 1 511 289 | 3/2005 |
| JP | 2003-240721 | 8/2003 |
| JP | 2005-300321 | 10/2005 |

* cited by examiner

Primary Examiner—Alan Cariaso

(57) ABSTRACT

An optical unit is provided with an integral light condensing section and a light transmitting section. The light condensing section is in a shape of a parabolic body of rotation substantially widening from a proximal end toward a distal end with a concave section opening at a proximal end face to accommodate a light emitting element, a side circumferential face to reflect the light from the light emitting element inward and a distal end face to introduce the light from the light emitting element into the light transmitting section. The light transmitting section is a substantially cylindrical shape of a smaller diameter than the light condensing section, and comprises a proximal end face to introduce the light from the light condensing section, a side circumferential face to reflect the light introduced from the proximal end face inward and a distal end face to emit the light.

3 Claims, 6 Drawing Sheets

OPTICAL UNIT AND LIGHT IRRADIATING DEVICE

FIELD OF THE ART

This invention relates to a spot light irradiating device, as being an optical unit having a compact arrangement, used for detecting flaws or a mark of a product (generally called as product inspection) by irradiating light on the product in a factory and an optical unit preferably used for this kind of the light irradiating device to uniformize the light.

BACKGROUND ART

Recently, as shown in the patent document 1, an LED that is superior to a halogen light source in stability of light intensity, a life duration and a fast response characteristic and that can be downsized with low heat generation has been used for a light source of this kind of light irradiating device.

Especially, for the light irradiating device referred to as a spot light irradiating device intended to emit light of the illumination intensity that is even as much as possible on a certain area, with the intention of making the light, emitted from the LED and whose light intensity is uneven, in a state of even surface emission, a columnar light transmission element referred to as a rod lens is arranged inside a distal end of a casing and the light emitted from the LED is made to pass through the rod lens so as to reduce the unevenness in the light intensity and then the light is emitted outside.

At this time, since it is necessary to condense the light emitted from the LED on a light introducing face as being a proximal end face of the rod lens, the inventor of this invention is now developing a light condensing lens that enables substantially all of the light emitted from the LED to emit in front by providing an additional reflection surface around the LED.

Patent document 1: Japan Patent Laid-open number 2003-240721

DISCLOSURE OF THE INVENTION

Problems to be Solved by the Invention

If the axis of the rod lens does not coincide with the axis of the light condensing lens, it is not possible to transmit the light emitted from a light source effectively, however, it is difficult to align the axes with high accuracy.

In addition, the more the number of components is, the more the number of processing steps or assembling steps becomes, thereby increasing the cost.

The present claimed invention intends to solve all of the problems and a main object of this invention is to provide an optical unit that does not require aligning the axis of the rod lens and the axis of the light condensing lens, and that can improve an assembling workability and to reduce a cost with less number of forting processes and less number of components and a light irradiating device that uses the optical unit.

Means to Solve the Problems

More specifically, the optical unit in accordance with this invention introduces light emitted from a light emitting element through a proximal end side and emits the light through a distal end side and comprises a light condensing section and a light transmitting section integrally formed at a distal end of the light condensing section with its axis coincided with an axis of the light condensing section, and is characterized by that the light condensing section is in a shape of a body of rotation substantially widening from a proximal end toward a distal end with centering on its optical axis, and comprises a concave section that opens at a proximal end face of the light condensing section to accommodate the light emitting element, a side circumferential face to reflect the light from the light emitting element inward and a distal end face to introduce the light from the light emitting element into the light transmitting section, and the light transmitting section is in a substantially cylindrical shape, and comprises a proximal end face to introduce the light from the light condensing section, a side circumferential face to reflect the light introduced from the proximal end face inward and a distal end face to emit the light introduced from the proximal end face outside.

In accordance with this arrangement, since the rod lens and the light condensing lens are integrally formed, it is unnecessary to align the axis of the rod lens and the axis of the light condensing lens and the transmission efficiency of the light emitted from the light emitting element is excellent.

In addition, the arrangement of integrating the rod lens and the light condensing lens makes it possible to reduce a number of the component, which improves the assembling workability in case of mounting the optical unit on a light irradiating device and contributes to reducing the cost.

In each of the above-mentioned arrangements, in order to make it possible to effectively introduce the light emitted from the light emitting element by enlarging only the proximal end face of the light transmitting section with keeping the diameter of the distal end portion of the light transmitting section restricted by an area on which the light transmitting section is mounted, it is preferable that a proximal end section of the light transmitting section is in a shape whose cross-sectional surface gradually widens toward the distal end of the light condensing section. In addition, with this arrangement, since the shape of the proximal end section of the light transmitting section is in common with the shape of a mounting portion of a conventional rod lens, a conventional holding structure can be diverted to a holding structure by, for example, a casing without changing the conventional holding structure.

The side circumferential face of the light transmitting section may be provided with no processing and may reflect the light totally by making use of difference in the refractive index. In addition, a metal film may be deposited on the side circumferential face or the side circumferential face may be covered with a mirror finished surface to reflect the light.

In addition, the light irradiating device in accordance with this invention comprises the optical unit of the above-mentioned arrangement and the light emitting element and is characterized by that the light from the light emitting element is emitted through the optical unit.

With this arrangement, since the optical unit to be mounted is of an arrangement that can be downsized, it is possible to provide the light irradiating device that is extremely downsized and high in efficiency with less unevenness in light intensity by making use of the combination of the compact optical unit.

It is preferable that the light irradiating device in accordance with this invention is so arranged that the light emitting element fits into the concave section of the optical unit without a bumpy movement so that an axis of the light emitting element is aligned with an axis of the light condensing section.

In addition, it is preferable that the light emitting element is fixed by being pushed in an axial direction.

Furthermore, it is preferable that the light irradiating device in accordance with this invention comprises a housing and is so arranged that the light transmitting section fits into the housing without a bumpy movement so that the housing and the optical unit are positioned in a direction orthogonal to the axis.

In this case, it is preferable that the optical unit is fixed with the distal end face of the light condensing section pushed in the axial direction by a constant force through an elastically transformable member.

The force that the elastically transformable member presses the optical unit is transmitted to the light emitting element such as an LED that fits into the proximal end concave section of the optical unit, and the heat dissipation efficiency of the light emitting element depends on a force that the light emitting element and a thermal conductor arranged in proximity to the light emitting element push each other. In addition, the heat dissipation efficiency has a great influence on an operating life of the light emitting element. As a result, if the pressure pushing the optical unit fluctuates, the operating life of the light emitting element also varies. However, with this arrangement, since the force that the light emitting element and the thermal conductor push each other becomes constant, it is possible to obtain the light irradiating device having even performance since the operating life of the light emitting element per each lot is even.

The light irradiating device is so arranged that the optical unit is fixed between the housing and a second housing by moving the housing to approach the second housing in an axial direction, and the second housing is mounted on the housing so that a distal end face of the housing is leveled with a distal end face of the optical unit or the distal end face of the housing is positioned with a constant distance kept from the distal end face of the optical unit in an axial direction.

An LED is preferably used as the light emitting element. With this arrangement, it is possible to make the light irradiating device superior in stability, operating life and quick response performance, downsized and low in developing fever.

EXPLANATION OF THE CODES

21 . . . light emitting element, 41 . . . light condensing section, 41a . . . proximal end face, 41b . . . distal end face, 41c . . . side circumferential face, 42 . . . light transmitting section, 42a . . . proximal end face, 42b . . . distal end face, 42c . . . side circumferential face, 43 . . . concave section, C. . . optical axis

Effect of the Invention

With this invention, it becomes unnecessary to align the axis of the rod lens and the axis of the light condensing lens, and it is possible to reduce a cost since an assembling workability can be improved with less number of forming processes and less number of components.

Best Modes of Embodying the Invention

One embodiment of the present claimed invention will be explained with reference to drawings.

Figure 1:
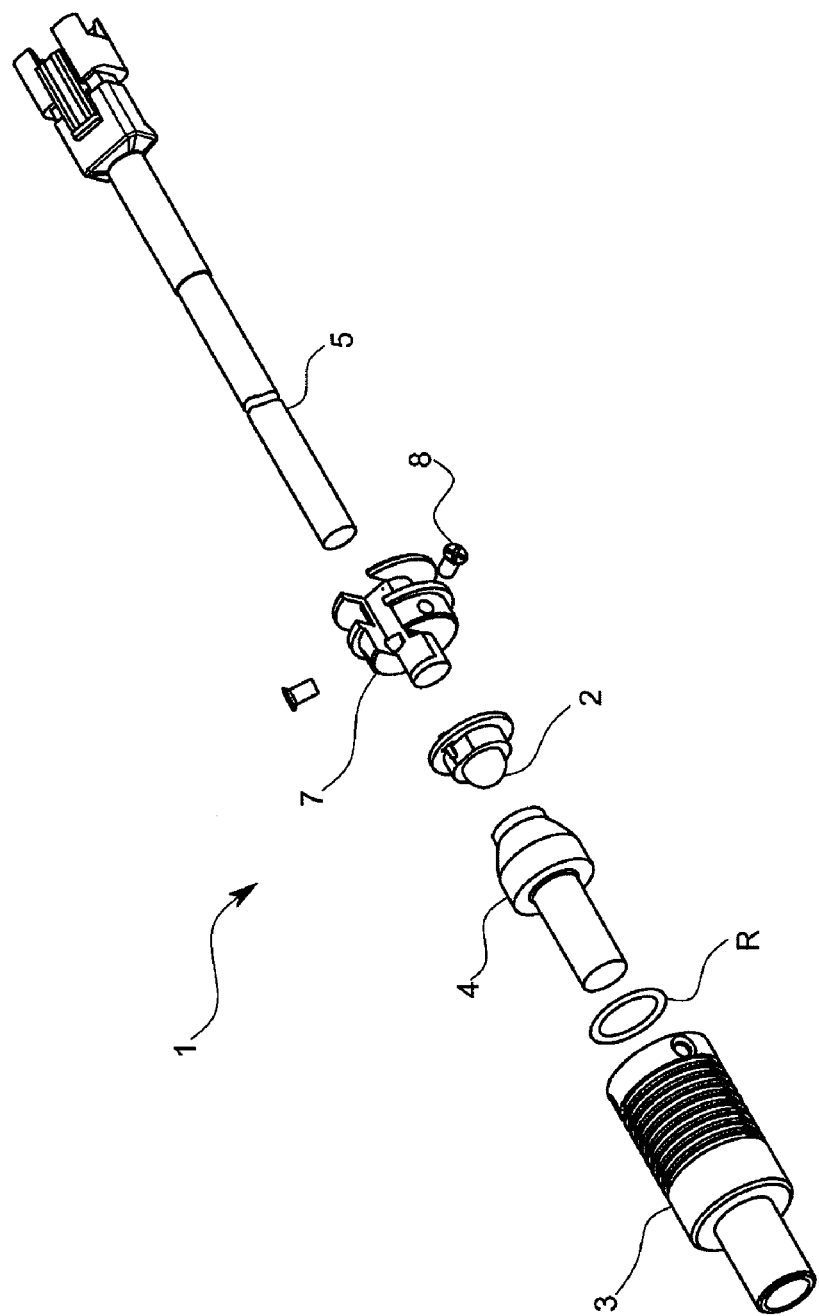
FIG. 1 is a pattern perspective view showing a configuration of a light irradiating device in accordance with one embodiment of the present claimed invention.
Figure 2:
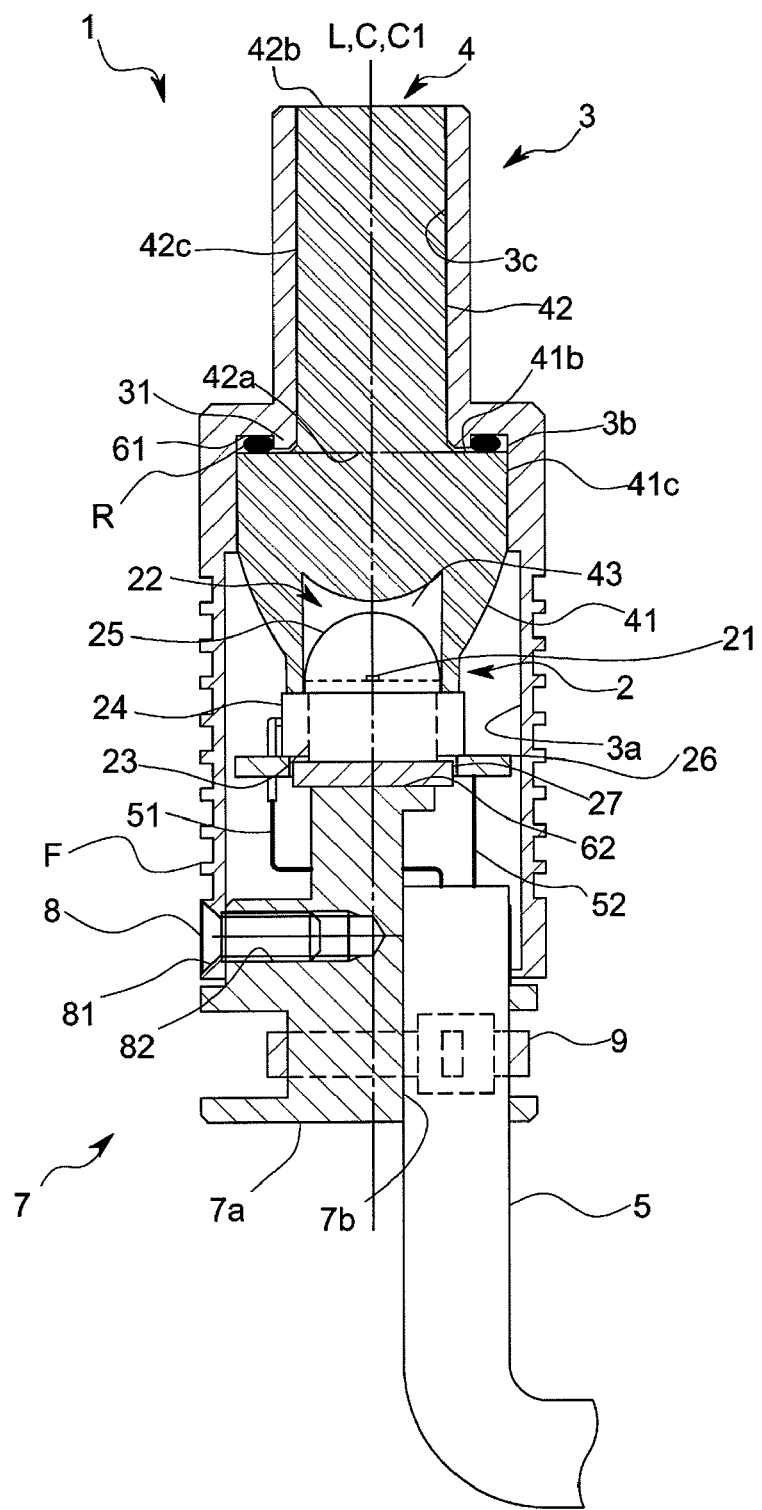
FIG. 2 is a pattern cross-sectional view of the light irradiating device in accordance with this embodiment.

A light irradiating device 1 in accordance with this embodiment is, as shown in FIG. 1 and FIG. 2, to emit light from a distal end face 42b of the light irradiating device 1 and comprises a housing 3, an optical unit 4 incorporated in the housing 3, a light source body 2 accommodated in a proximal end concave section 43 of the optical unit 4, an electricity cable bundle 5 that supplies the light source body 2 with electric power from outside and a bottom cover 7 that fixes the light source body 2 as a second housing with a pressing force and holds the electricity cable bundle 5.

The light source body 2 comprises, as shown in FIG. 2, an LED element 21 as being a light emitting element and a holding member 22 that holds the LED element 21. The light source body 2 is so-called a power LED wherein the LED element 21 and the holding member 22 are integrated.

The LED element 21 can flow electric current more than or equal to 200 mA (for example, preferably 200 mA~2 A) continuously during a predetermined period, and emits light with a big light intensity compared to a conventional LED even if the LED element 21 is a single body. The holding member 22 comprises a block-shaped conductor 23 that is made of metal (for example, copper) and good in thermal conductivity and that is loaded with the LED element 21 by means of the die bonding or the like, a resin frame 24 that fits over and supports the conductor 23 and a hemispherical solid transparent resin mold section 25 that protects the above-mentioned LED element 21. Furthermore, in this embodiment, the light source body 2 comprises a glass epoxy substrate 26, through which the LED element 21 and lead wires 51, 52 extending from the electricity cable bundle 5 are connected. The glass epoxy substrate 26 is toric and loaded with the resin frame 24 near its center opening and exposes a bottom face of the light source body 2, more concretely a bottom face of the conductor 23.

Figure 3:
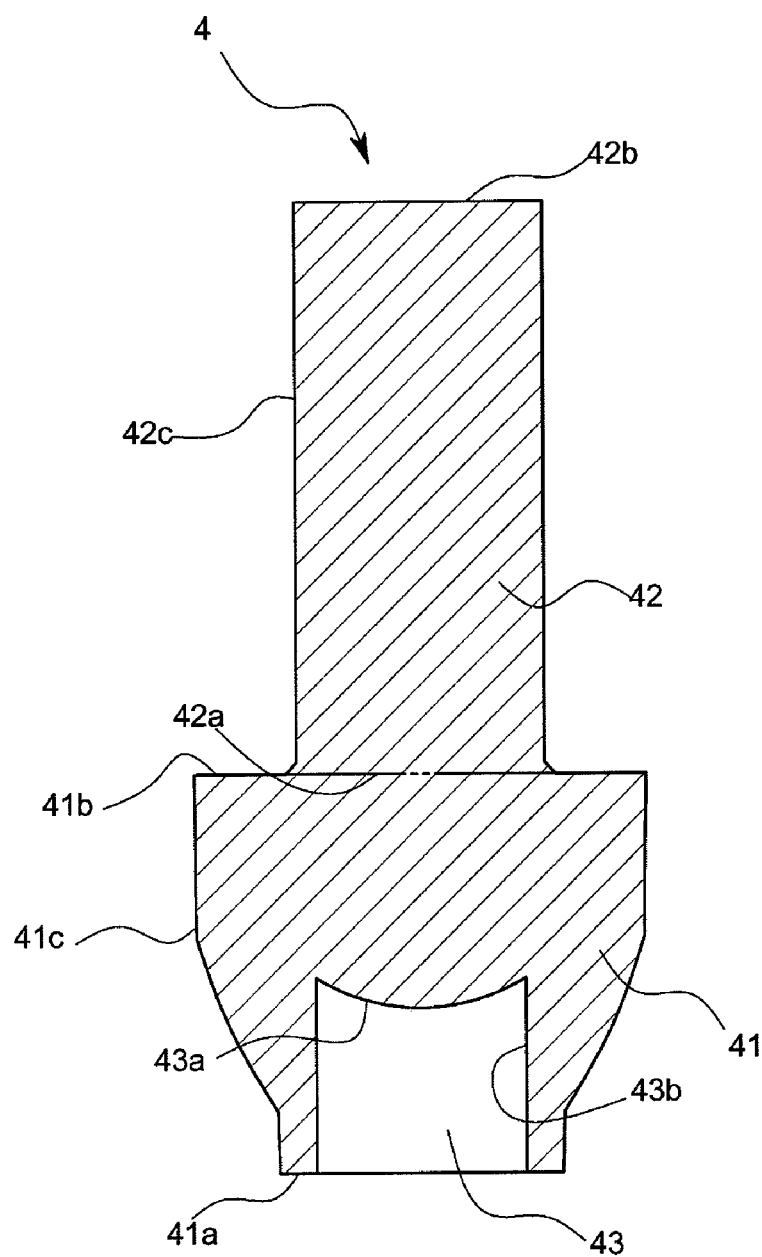
FIG. 3 is a cross-sectional view of an optical unit in accordance with this embodiment.

The optical unit 4 is, as shown in FIG. 2 and FIG. 3, in a shape of a body of rotation whose cross-sectional area of its proximal end side gradually widening from a proximal end toward a distal end, and made of transparent resin wherein a light condensing section 41 whose distal end side is in a circular shape in cross-section and a columnar light transmitting section 42 arranged at a distal end of the light condensing section 41 are integrally formed with each axis coincided.

As shown in FIG. 3, the concave section 43 to accommodate the LED element 21 is arranged to open at a distal end face of the light condensing section 41. The concave section 43 fits over an outer circumstance of the resin mold section 25 without a bumpy movement and the LED element 21 is arranged on an axial line C1 of the optical unit 4. A bottom face 43a of the concave section 43 is formed in a shape of a convex lens bulging toward the proximal end side, and its side face 43b is substantially parallel to the axial line C1 (the side face 43b may be tapered to widen toward the proximal end side for the sake of manufacturing or refraction). A side circumferential face 41c as being a reflex element is formed on a side face of the light condensing section 41 and a cross-sectional outline of a proximal end side of the side circumferential face 41c forms parabola and a distal end side of the side circumferential face 41c is formed to be cylindrical.

Figure 4:
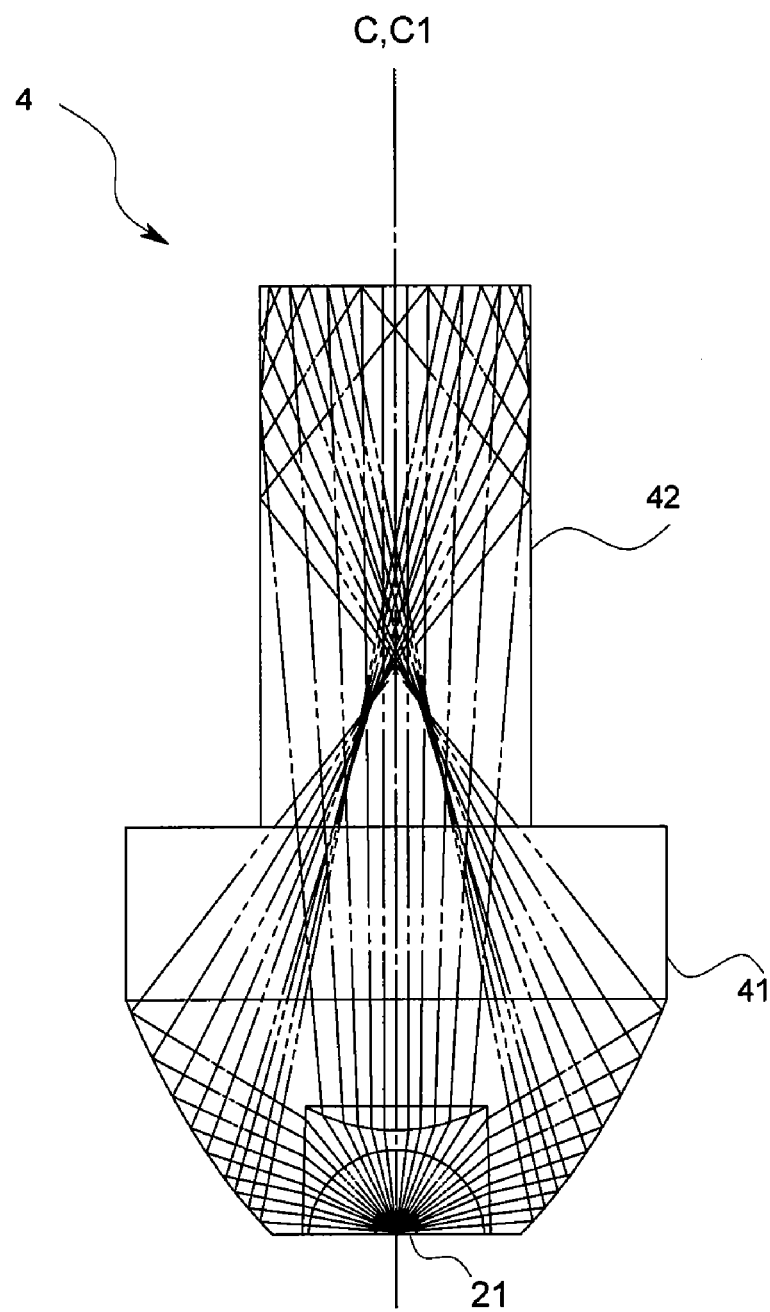
FIG. 4 is an explanatory view of a movement showing a ray of light traveling inside the optical unit in accordance with this embodiment (a part of which is modified).

As shown in FIG. 4, substantially all of the light passing the side face 43b of the concave section 43 among the light emitted from the LED element 21 reaches the proximal end side whose cross-sectional outline forms the parabola and totally reflects on the proximal end side and then the totally reflected light is introduced into the light transmitting section 42 as the light approaching the optical axis C each other. While substantially all of the light refracted and passing the bottom face 43a of the concave section 43 among the light emitted from the LED element 21 is also introduced into the light transmitting section 42 as the light approaching the optical axis C each other. The proximal end of the light condensing section 41 in the embodiment shown in FIG. 4 is shorter than that in the above-mentioned embodiment and the light transmitting section 42 is in a shape of a cylindrical column whose cross-sectional area in a direction perpendicular to the axis from a proximal end to a distal end is uniform.

As mentioned, substantially all of the light emitted from the LED element 21 and emitted outside through the distal end face of the light condensing section 41 is introduced into the light transmitting section 42.

The light transmitting section 42 is in a cylindrical column shape and comprises a proximal end face 42a that introduces the light from the light condensing section 41, a side circumferential face 42c that reflects the light introduced from the proximal end face 42a inward and a distal end face 42b that emits the light introduced through the proximal end face 42a outside. The light transmitting section 42 fits into a small diameter section 3c of the housing 3.

Furthermore, in this embodiment, the proximal end section of the light transmitting section 42 is in a shape of a circular cone with its head cut whose cross-sectional area gradually widens toward a distal end face 41b of the light condensing section 41.

Since the proximal end section of the light transmitting section 42 is in the shape of the circular cone with its head cut whose cross-sectional area gradually widens toward the distal end face 41b of the light condensing section 41, it is possible for the light transmitting section 42 to receive the light introduced from the light condensing section 41 in a bigger area. As a result, there is a merit that it is possible to introduce further more light into the light transmitting section 42. More specifically, if the LED element 21 is an ideal point light source, it is possible to make all of the light approach the optical axis C by means of the light condensing section 41 of the optical unit 4, however, diffusion light that leaves from the optical axis C is inevitably included actually. Then the arrangement wherein the proximal end section of the light transmitting section 42 is in the shape of the circular cone with its head cut whose cross-sectional area gradually widens toward the distal end face 41b of the light condensing section 41 makes it possible to take the diffusion light also inside the light transmitting section 42, thereby improving the light transmission efficiency by suppressing the loss of the light intensity in this portion.

Since a shape of the light transmitting section 42 is substantially the same as a conventional rod lens although the proximal end section of the light transmitting section 42 is in the shape of the circular cone with its head cut whose cross-sectional area gradually widens toward the distal end face 41b of the light condensing section 41, there is no need of remodeling the small diameter section 3c of the housing 3 from a conventional housing.

The housing 3 is, as shown in FIG. 1 and FIG. 2, in a shape of a body of rotation. In addition, the housing 3 has a radiating fin F as being a radiator by arranging multiple grooves each of which has a bottom on its outer circumference.

The housing 3 has a center bore penetrating in a direction of an axial line L and the center bore comprises a big diameter section 3a that is formed on the proximal end section of the housing 3 and the small diameter section 3c that is formed on a distal end of the big diameter section 3a through a step. The big diameter section 3a is in a cylindrical shape having a certain inside diameter substantially the same as the outer diameter of the distal end face 41b of the light condensing section 41 and accommodates all of the light condensing section 41. The small diameter section 3c is in a cylindrical shape having a certain inside diameter and arranged continuous to the big diameter section 3a. The small diameter section 3c is substantially the same in diameter as that of the light transmitting section 42 and fits over the light transmitting section 42 substantially without a bumpy movement.

The bottom cover 7 is a circle in its cross-section and is provided with a cable insertion bore 7b to penetrate the bottom cover 7 through a bottom face 7a, and the electricity cable bundle 5 is inserted into the cable insertion bore 7b from outside and the lead wires 51, 52 of the electricity cable bundle 5 are connected to the substrate 26 of the light source body 2 by means of soldering. The cable insertion bore 7b is in a shape of a "U" character whose cutout extends to an end of the bottom face 7a of the bottom cover 7.

A screw hole 81 is arranged on a side face of the housing 3 and an internal thread bore 82 is arranged on a side face of the bottom cover 7. The bottom cover 7 is fixed to the housing 3 by fittingly inserting the bottom cover 7 into the big diameter section 3a of the housing 3, overlapping the screw hole 81 arranged on the housing 3 with the internal thread bore 82 arranged on the bottom cover 7, and inserting and rotating a screw 8 into the overlapped screw hole 81 and the internal thread bore 82.

The light irradiating device 1 in accordance with this embodiment comprises a fixing structure to fix the light source body 2 and the optical unit 4 between the pressing face 61 of the housing 3 and the pressing face 62 of the bottom cover 7 after inserting the bottom cover 7 into the housing 3 and an axis aligning structure to align the optical axis C of the light source body 2 with the axial line C1 of the optical unit 4 by fittingly inserting the light source body 2 into the proximal end concave section 43 of the light condensing section 41 without any bumpy movement involved by fixation by means of the fixing structure.

The light irradiating device 1 in accordance with this embodiment further comprises a positioning structure to align the axial line C1 of the optical unit 4 with the axial line L of the housing 3 by fittingly inserting the light transmitting section 42 of the side circumferential face 41c of the optical unit 4 into the housing without any bumpy movement.

The fixing structure has a pressing face 61 arranged on the housing 3 and a pressing face 62 arranged on the bottom cover 7 to face the pressing face 61, and fixes the light source body 2 between the pressing face 61 and the pressing face 62 by making use of approaching the pressing faces 61 and 62. The pressing face 61 arranged on the housing 3 is formed on a bottom face of a concave section 3b formed by making use of the step between the big diameter section 3a and the small diameter section 3c. The pressing face 61 faces the bottom cover 7 and presses the distal end face 41b of the light condensing section 41 of the optical unit 4 through an O-ring R as being an elastically transformable member. The pressing face 62 arranged on the bottom cover 7 presses a bottom face of a conductor 23 of the light source body 2 through a heat conduction plate 27 made of a material such as aluminum nitride having electrical isolation properties.

The axis aligning structure aligns the optical axis C of the LED element 21 held by a holding member 22 with the axial line C1 of the optical unit 4 by fittingly inserting the proximal end concave section 43 of the optical unit 4 over the resin mold section 25 of the holding member 22 involved by fixing the light source body 2.

The positioning structure aligns the axial line C1 of the optical unit 4 with the axial line L of the housing 3 by fittingly inserting the light transmitting section 42 of the optical unit 4 into the small diameter section 3c of the housing 3.

An example of a method for assembling the light irradiating device 1 having the above-mentioned arrangement will be described.

First, the lead wires 51 and 52 are connected to the substrate 26 of the light source body 2 by means of soldering. Next, the proximal end concave section 43 of the optical unit 4 is fitted over the resin mold section 25.

On the one hand, the optical unit 4 is mounted on the housing 3 with procedures: the O-ring R is inserted into the concave section 3b of the housing 3 so as to make contact with or be close to the pressing face 61, and then the light transmitting section 42 of the optical unit 4 is inserted into inside the housing 3 until the light transmitting section 42 fits into the small diameter section 3c of the housing 3 and the distal end face 42b of the light transmitting section 42 becomes leveled with the distal end face of the housing 3 by pushing the distal end face 42b of the light transmitting section 42 and the distal end face of the housing against a plane surface.

With this state kept, the housing 3 is fastened with the bottom cover 7. More specifically, the electricity cable bundle 5 is fitted into a cutout section of the cable insertion bore 7b arranged on the bottom cover 7 and then the bottom cover 7 is fittingly inserted into the big diameter section 3a of the housing 3. Next, the screw hole 81 arranged on the housing 3 is overlapped with the internal thread bore 82 arranged on the bottom cover 7 and the screw 8 is inserted into the screw hole 81 and the internal thread bore 82 each of which is overlapped and then rotated so that the bottom cover 7 is fixed in the axial direction. Then since the pressing face 61 pushes the light condensing section 41 of the optical unit 4 toward the bottom cover 7 through the O-ring R and the pressing face 62 pushes the bottom face of the conductor 23 toward the housing 3 through the heat conduction plate 27 during a process of inserting the bottom cover 7 into the big diameter section 3a of the housing 3, the light source body 2 and the optical unit 4 are fixed between the pressing face 61 and the pressing face 62.

In addition, since the proximal end concave section 43 of the optical unit 4 tightly fits over the resin mold section 25 of the holding member 22 and the light transmitting section 42 of the optical unit 4 fits into the small diameter section 3c of the housing 3 during the process of fixing the light source body 2 and the optical unit 4, the optical axis C of the LED element 21 held by the holding member 22, the axial line C1 of the optical unit 4 and the axial line L of the housing 3 are aligned.

The O-ring R elastically transforms a little at a predetermined position where the screw hole 81 of the housing 3 overlaps the internal thread bore 82 of the bottom cover 7 and holds the optical unit 4 by applying a force to urge and push the optical unit 4. With this arrangement, it is possible to hold the optical unit 4 without causing a bumpy movement and without applying an excessive pushing pressure to the optical unit 4. In addition, elastic transformation of the O-ring R contributes to prevention of the distal end of the optical unit 4 from popping out of the distal end of the housing 3, even though a dimensional accuracy in the axial direction of the light condensing section 41 is low.

In addition, in this embodiment, as shown in FIG. 2, since the bottom cover 7 also serves as holding the electricity cable bundle 5 by means of the cable insertion bore 7b, the electricity cable bundle 5 is fixed to the bottom cover 7 through a bundle band 9 by inserting the electricity cable bundle 5 into the cable insertion bore 7b.

With this arrangement, since the electricity cable bundle 5 is held inside the cable inserting bore 7b, unreasonable force will not be applied to a connecting portion between the electricity cable bundle 5 and the light source body 2 even though some tensile force or pressing force is applied to the electricity cable bundle 5, thereby preventing a problem of electrically disconnection or contact failure. Furthermore, since the cable insertion bore 7b is completely blocked by the electricity cable bundle 5, it is possible to prevent a problem of leaking the light through the cable insertion bore 7b.

As mentioned, in accordance with the light irradiating device 1 of this embodiment, various effects can be obtained; assembling is very simple, the optical unit 4 and the light source body 2 can be fixed and positioned simultaneously at a time of assembling, and disconnection of the electricity cable bundle 5 can be avoided.

The present claimed invention is not limited to the above-mentioned embodiment.

Figure 5:
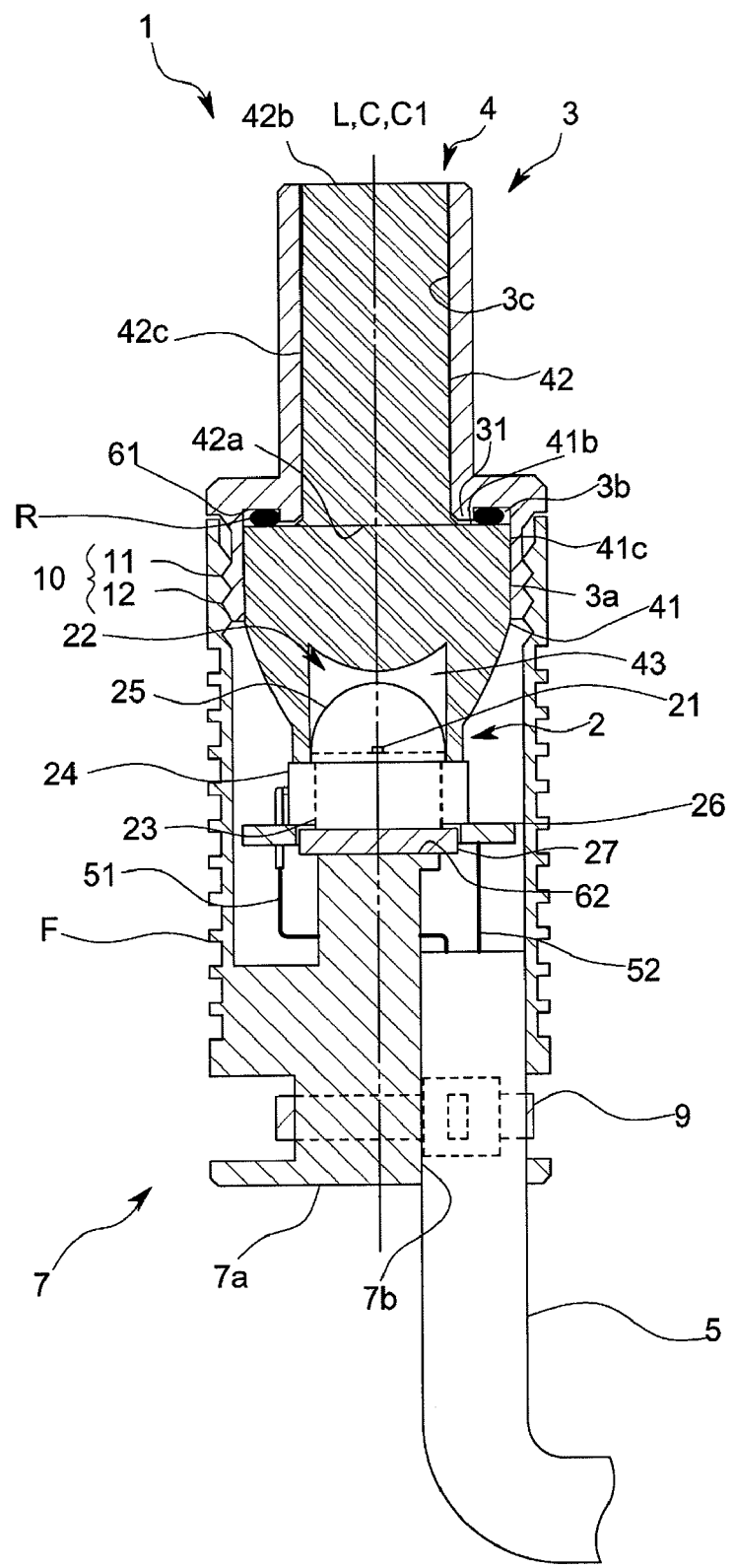
FIG. 5 is a pattern cross-sectional view of a light irradiating device in accordance with another embodiment of the present claimed invention.

As shown in FIG. 5, the housing 3 and the bottom cover 7 may be threadably connected in series through a screw feed mechanism 10. In this embodiment, multiple grooves having a bottom are arranged on an outer circumference of the bottom cover 7 so as to form the radiation fin F as being a radiation section, and the big diameter section 3a is formed on the bottom cover 7. The housing 3 and the bottom cover 7 are mutually connected by the screw sections 11, 12 formed on its connecting portions. More specifically, an internal thread section 11 is formed on the proximal end section of the housing 3. Furthermore, an external thread section 12 that can be threadably mounted on the internally thread section 12 is formed on the distal end section of the bottom cover 7.

The light irradiating device 1 in accordance with this embodiment fixes the light source body 2 to the optical unit 4 with pressing the light source body 2 and the optical unit 3 between the housing 3 and the bottom cover 7 by making use of approaching the pressing faces 61, 62 involved by a threadably connecting process of the housing 3 and the bottom cover 7.

An example of a method for assembling the light irradiating device 1 having the above arrangement will be explained.

First, the lead wires 51, 52 extending from the electricity cable bundle 5 are connected to the substrate 26 of the light source body 2 by means of soldering, the light source body 2 and the heat conduction plate 27 are inserted into the bottom cover 7 so as to be installed tentatively, and the electricity cable bundle 5 is inserted into the bottom cover 7 through a cutout portion of the cable insertion bore 7b.

On the one hand, the optical unit 4 is mounted on the housing 3 with procedures: the O-ring R is inserted into the concave section 3b of the housing 3 so as to make contact with or be close to the pressing face 61, and then the light transmitting section 42 of the optical unit 4 is fittingly inserted into the small diameter section 3c of the housing 3 so that the distal end face 42b of the light transmitting section 42 becomes leveled with the distal end face of the housing 3 by pushing the distal end face 42b of the light transmitting section 42 and the distal end face of the housing 3 against a plane surface. At this time, a small projection 31 formed adjacent to the pressing face 61 of the housing 3 does not make contact with the distal end face 41b of the light condensing section 41 and a small space generates between the small projection 31 and the distal end face 41b of the light condensing section 41. In addition, since a size of the housing 3 and a size of the optical unit 4 are precisely controlled, a gap between the housing 3 and the optical unit 4 becomes constant without variation for each light irradiating devices and a force that the pressing face 61 presses the optical unit 4 through the O-ring R is also controlled to be constant at any time.

With this state kept, the housing 3 and the bottom cover 7 are fastened. More specifically, the internal thread section 11 of the housing 3 is threadably mounted on the external thread section 12 of the bottom cover 7 by rotating the housing 3. Then during a process wherein the housing 3 and the bottom cover 7 further approach each other, the proximal end concave section 43 of the optical unit 4 fits over the resin mold section 25 of the light source body 2 and the pressing face 61 pushes the distal end face 41b of the light condensing section 41 toward the bottom cover 7 through the O-ring R and the pressing face 62 pushes the bottom face of the conductor 23 toward the housing 3 through the heat conduction plate 27, the optical unit 4 and the light source body 2 are fixed with pressure between the pressing faces 61, 62. During this process, since the distal end face 42b of the light transmitting section 42 and the distal end face of the housing 3 are kept in a state of being pushed against the plane surface so as to be level, a degree to threadably mount the externally thread section 12 on the internally thread section 11 can be adjusted in case that a size of the light source body 2 fluctuates. As a result, the distal end of the external thread section 12 may not make contact with the housing 3 with leaving a small gap between the external thread section 12 and the housing 3. In this case, a baffle process is applied to the screw feed mechanism 10 after the internally thread section 11 is threadably mounted on the externally thread section 12 and then the housing 3 is fixed to the bottom cover 7.

In accordance with this embodiment, since the force that the pressing face 61 presses the optical unit 4 and the light source body 2 becomes stable due to the housing 3 and the optical unit 4 whose size accuracy is high, it is possible to absorb the fluctuation of the size of the light source body 2 by making use of the screw feed mechanism 10.

In addition, in case that a cross-sectional area of the light transmitting section 42 is large enough, the proximal end section of the light transmitting section 42 may not be in a conical shape with its head cut whose cross-sectional area gradually widens toward a distal end face 41b of the light condensing section 41.

Furthermore, the proximal end section of the light transmitting section 42 is not limited to a circular shape in its cross-section, and its cross-section may be in a polygonal shape. And it may not be limited to a shape like the conical shape with its head cut wherein its generating line extends linearly, and may be a shape whose generating line extends with forming a curve.

Figure 6:
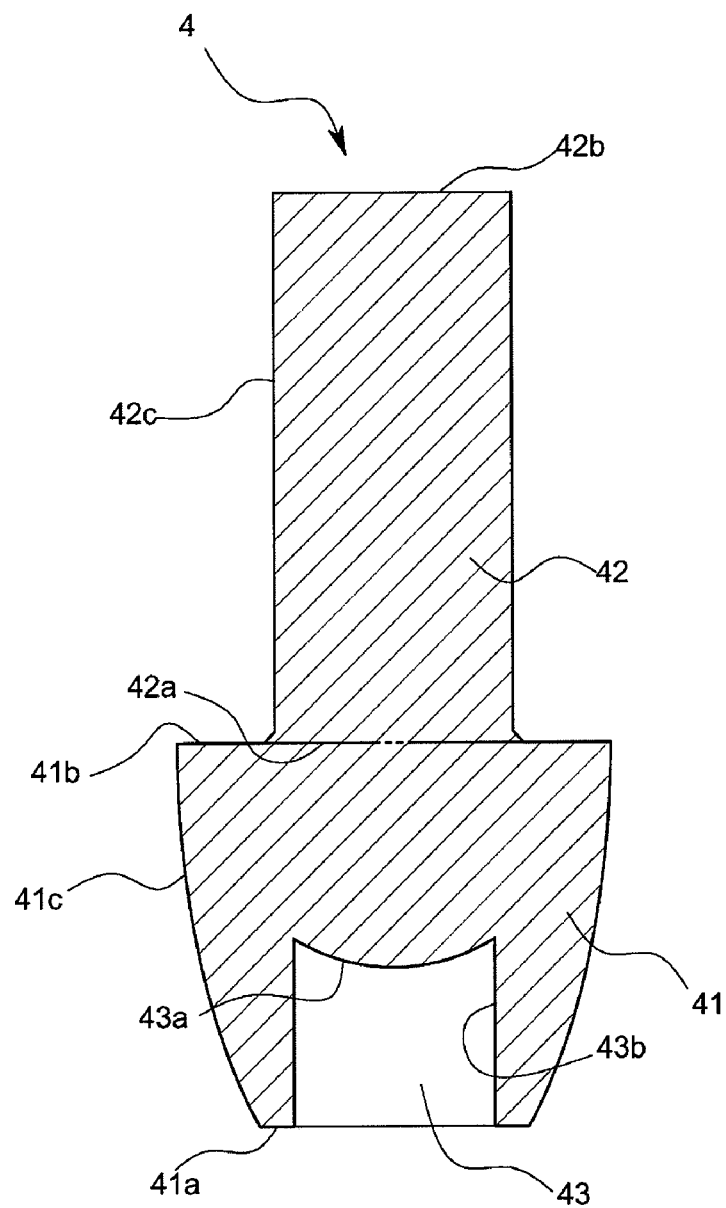
FIG. 6 is a cross-sectional view of an optical unit in accordance with another embodiment of the present claimed invention.

The light condensing section 41 may be, as shown in FIG. 6, so formed that its side circumferential face 41c is continuous from its proximal end to its distal end and its cross-sectional outline draws a parabola. In addition, a bottom section 43a of the concave section 43 may be flat.

Furthermore, for example, a coil spring may be used in stead of the O-ring R, and it is a matter of course that the fixing structure can be varied in accordance with a shape of the TED element 21, a shape of the housing 3 or a shape of the bottom cover 7. In addition, the substrate 26 may be omitted in some cases.

It is a matter of course that the light irradiating device is not limited to a lighting use but may be used for promoting, for example, a chemical reaction.

In addition, an ordinary LED may be used as the light source body 2 and a halogen lamp or a tungsten lamp may be used.

The present claimed invention may be variously modified without departing from the spirit of the invention and is not limited to the above-mentioned embodiment. A part or all of the above-mentioned various configurations may be appropriately combined.

Possible Applications in Industry

As mentioned, in accordance with the present claimed invention, it is unnecessary to align the axis of the rod lens and the axis of the light condensing lens, and it is possible to improve an assembling workability and to reduce a cost with less number of forming processes and less number of components due to its downsized structure.

The invention claimed is:

1. An optical unit that introduces light emitted from a light emitting element through a proximal end side and emits the light through a distal end side comprising:
   a light condensing section; and
   a light transmitting section integrally formed at a distal end of the light condensing section with respective optical axes coincided with each other,
   the light condensing section includes a shape of a parabolic body of rotation substantially widening from a proximal end toward a distal end including a central lower concave section that opens at a proximal end face of the light condensing section to accommodate a light emitting element, a lower side parabola circumferential face to reflect light from the light emitting element inward and a cylindrical upper side face having a distal end face to introduce the light from the light emitting element into the light transmitting section, wherein
   the light transmitting section is in a substantially cylindrical shape, with a proximal end face of a smaller diameter than the light condensing section distal end face to provide a mounting surface, the proximal end face introduces the light from the light condensing section and includes a side circumferential face to reflect the light introduced from the proximal end face inward and a distal flat end face to emit the light introduced from the proximal end face.

2. An optical unit that introduces light emitted from a light emitting element through a proximal end side and emits the light through a distal end side comprising:
   a light condensing section;
   a light transmitting section integrally formed at a distal end of the light condensing section with respective optical axes coincided with each other,
   the light condensing section includes a shape of a parabolic body of rotation substantially widening from a proximal end toward a distal end including a central lower concave section that opens at a proximal end face of the light condensing section to accommodate a light emitting element, a lower side parabola circumferential face to reflect light from the light emitting element inward and a cylindrical upper side face having a distal end face to introduce the light from the light emitting element into the light transmitting section, wherein the light transmitting section is in a substantially cylindrical shape, with a proximal end face of a smaller diameter than the light condensing section distal end face to provide a mounting surface, the proximal end face introduces the light from the light condensing section and includes a side circumferential face with a reflection coating to reflect the light introduced from the proximal end face inward and a distal flat end face to emit the light introduced from the proximal end face;

a hollow housing having an interior cavity complementary to the light condensing section and light transmitting section exterior surfaces; and an elastically transformable member mounted between the housing and adjacent the distal end face of the light condensing section to provide a constant force between the hollow housing and the integral light condensing section.

3. The optical unit described in claim 2 wherein the light emitting element is an LED.

* * * * *